United States Patent
Schulte et al.

(10) Patent No.: US 8,959,496 B2
(45) Date of Patent: Feb. 17, 2015

(54) AUTOMATIC PARALLELIZATION IN A TRACING JUST-IN-TIME COMPILER SYSTEM

(75) Inventors: Wolfram Schulte, Bellevue, WA (US); Nikolai Tillmann, Redmond, WA (US); Michal J. Moskal, Seattle, WA (US); Manuel A. Fahndrich, Seattle, WA (US); Daniel J P Leijen, Bellevue, WA (US); Barend H. Venter, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 12/764,103

(22) Filed: Apr. 21, 2010

(65) Prior Publication Data

US 2011/0265067 A1   Oct. 27, 2011

(51) Int. Cl.
G06F 9/44 (2006.01)
G06F 9/45 (2006.01)
G06F 9/455 (2006.01)
G06F 9/445 (2006.01)

(52) U.S. Cl.
CPC ............ *G06F 9/45516* (2013.01); *G06F 8/456* (2013.01); *G06F 9/445* (2013.01); *G06F 9/443* (2013.01)
USPC ............ 717/148; 717/140; 717/150; 717/128

(58) Field of Classification Search
CPC ..... G06F 9/45516; G06F 9/445; G06F 9/443; G06F 8/456
See application file for complete search history.

(56) References Cited

U.S. PATENT DOCUMENTS

| | | | |
|---|---|---|---|
| 6,282,702 B1 * | 8/2001 | Ungar | 717/148 |
| 6,412,107 B1 * | 6/2002 | Cyran et al. | 717/148 |
| 6,883,165 B1 * | 4/2005 | Blandy et al. | 717/148 |
| 6,948,160 B2 * | 9/2005 | Click et al. | 717/148 |
| 7,171,544 B2 | 1/2007 | Bera | |
| 7,228,533 B2 * | 6/2007 | Sokolov | 717/148 |
| 7,487,497 B2 * | 2/2009 | Ren et al. | 717/150 |
| 7,581,215 B1 | 8/2009 | Song et al. | |

(Continued)

OTHER PUBLICATIONS

Borys J. Bradel, Automatic Trace-Based Parallelization of Recursive Programs, University of Toronto, 2008, pp. 4-17.*

(Continued)

*Primary Examiner* — Thuy Dao
*Assistant Examiner* — Mongbao Nguyen
(74) *Attorney, Agent, or Firm* — Sandy Swain; Judy Yee; Micky Minhas

(57) ABSTRACT

A tracing just-in-time (TJIT) compiler system is described for performing parallelization of code in a runtime phase in the execution of code. Upon detecting a hot loop during the execution of the code, the compiler system extracts trace information from sequentially recorded traces. In a first phase, the compiler system uses the trace information to identify at least one group of operation components that can be operated on in a parallel manner. In a second phase, the compiler system provides instructions which allocate the group of operation components to plural processing resources. A native code generator module carries out those instructions by recompiling native code that directs the operation of a native system to perform parallel processing. The compiler system terminates a group if it encounters program data in a loop iteration that is not consistent with previously encountered predicated information (upon which it records a new trace in a sequential manner).

20 Claims, 11 Drawing Sheets

(56) References Cited

U.S. PATENT DOCUMENTS

| | | | | |
|---|---|---|---|---|
| 7,757,222 | B2* | 7/2010 | Liao et al. | 717/140 |
| 7,865,886 | B2* | 1/2011 | Plum | 717/160 |
| 8,365,157 | B2* | 1/2013 | Lagergren | 717/148 |
| 8,458,671 | B1* | 6/2013 | Hostetter et al. | 717/131 |
| 8,479,179 | B2* | 7/2013 | Wu et al. | 717/150 |
| 8,539,455 | B2* | 9/2013 | Berg et al. | 717/131 |
| 2002/0073403 | A1* | 6/2002 | Fleehart et al. | 717/131 |
| 2004/0098711 | A1* | 5/2004 | Song et al. | 717/150 |
| 2005/0188364 | A1 | 8/2005 | Cockx et al. | |
| 2006/0101416 | A1* | 5/2006 | Callahan et al. | 717/128 |
| 2006/0242627 | A1* | 10/2006 | Wygodny et al. | 717/128 |
| 2007/0169033 | A1* | 7/2007 | Metzgen | 717/140 |
| 2008/0052689 | A1* | 2/2008 | Archambault et al. | 717/140 |
| 2008/0114937 | A1* | 5/2008 | Reid et al. | 711/117 |
| 2008/0127146 | A1* | 5/2008 | Liao et al. | 717/150 |
| 2008/0134148 | A1* | 6/2008 | Clark | 717/128 |
| 2008/0134158 | A1* | 6/2008 | Salz et al. | 717/148 |
| 2008/0195847 | A1* | 8/2008 | Wu et al. | 712/216 |
| 2008/0229298 | A1* | 9/2008 | O'Brien et al. | 717/160 |
| 2008/0244549 | A1 | 10/2008 | Kejariwal et al. | |
| 2009/0064113 | A1* | 3/2009 | Langman et al. | 717/148 |
| 2009/0276766 | A1 | 11/2009 | Song et al. | |
| 2009/0307655 | A1 | 12/2009 | Pingali et al. | |
| 2009/0307675 | A1* | 12/2009 | Ng et al. | 717/160 |
| 2010/0031241 | A1* | 2/2010 | Schwartz | 717/149 |
| 2010/0122242 | A1* | 5/2010 | Jiva | 717/148 |
| 2010/0275191 | A1* | 10/2010 | Duffy et al. | 717/150 |

OTHER PUBLICATIONS

Markus Geimer, Scalable Parallel Trace-Based Performance Analysis, 2006, pp. 304-307.*
Yun-Woei Fann, An Intelligent Parallel Loop Scheduling for Parallelizing Compilers, 1999, pp. 169-173 and 178-188.*
Borys J. Bradel, A study of potential parallelism among traces in Java programs, 2009, pp. 296-308.*
James Swaine, Back to the Futures: Incremental Parallelization of Existing Sequential Runtime Systems, 2010, pp. 1-7.*
Michael K. Chen, TEST: A Tracer for Extracting Speculative Threads, 2003, pp. 1-11.*
Jungwoo Ha, A Concurrent Trace-based Just-In-Time Compiler for Single-threaded JavaScript, 2009, pp. 47-52.*
Efe Yardimci, Dynamic Parallelization and Vectorization of Binary Executables on Hierarchical Platforms, 2008, pp. 1-17.*
Chan, et al., "Run-Time Support for the Automatic Parallelization of Java Programs," retrieved at <<http://www.eecg.toronto.edu/~tsa/papers/ChAb01.pdf>>, The Journal of Supercomputing, vol. 28 , Issue 1, Apr. 2004, 8 pages.
Saltz, et al., "Run-Time Parallelization and Scheduling of Loops," retrieved at <<http://doi.ieeecomputersociety.org/10.1109/12.88484>>, IEEE Transactions on Computers, vol. 40 , Issue 5, May 1991, pp. 603-612.
Artigas, et al., "Automatic Loop Transformations and Parallelization for Java," retrieved at <<http://doi.acm.org/10.1145/335231.335232>>, Proceedings of the 14th International Conference on Supercomputing, May 2000, 10 pages.
Bradel, et al., "Automatic Trace-Based Parallelization of Java Programs," retrieved at <<http://ieeexplore.ieee.org/stamp/stamp. jsp?arnumber=04343833>>, Proceedings of the 2007 International Conference on Parallel Processing, 2007, 10 pages.
Rauchwerger, et al., "The LRPD Test: Speculative Run-time Parallelization of Loops with Privatization and Reduction Parallelization," retrieved at <<http://doi.acm.org/10.1145/207110.207148>>, Proceedings of the ACM SIGPLAN 1995 Conference on Programming Language design and Implementation, 1995, pp. 218-232.
"Automatic Parallelization," Wikipedia entry, retrieved at <<http://en.wikipedia.org/wiki/Automatic_parallelization>>, retrieved on Apr. 19, 2010, 1 page.
"Loop Optimization," Wikipedia entry, retrieved at <<http://en.wikipedia.org/wiki/Loop_optimization>>, retrieved on Apr. 19, 2010, 4 pages.
Muchnick, et al., "Efficient Instruction Scheduling for a Pipelined Architecture," version retrieved at <<http://acm.org>>, ACM SIGPLAN Notices, vol. 39 No. 4, Apr. 2004, pp. 167-174.
Ha, et al., "A Concurrent Trace-based Just-In-Time Compiler for Single-threaded JavaScript," version retrieved at <<http://www.east.isi.edu/~jha/papers/cjit-pespma09.pdf>>, The 2nd Workshop on Parallel Execution of Sequential Programs on Multi-core Architectures, 2009, 8 pages.
Rauchwerger, Lawrence, "Run-Time Parallelization: It's Time Has Come," version retrieved at <<http://reptar.uta.edu/NOTES4351/rauchwerger.pdf>>, Special Issues on Languages and Compilers for Parallel Computers, 1998, 25 pages.
Moura, et al., "Z3: An Efficient Smt Solver," version retrieved at <<http://citeseerx.ist.psu.edu/viewdoc/download;jsessionid=449FFE9CFD074161949631F585E106D0?doi=10.1.1.86.5840&rep=rep1&type=pdf>>, Tools and Algorithms for the Construction and Analysis of Systems, vol. 4963/2008, Apr. 3, 2008, 4 pages.
King, James C., "Symbolic Execution and Program Testing," Communications of the ACM, vol. 19, Issue 7, Jul. 1976, pp. 385-394.
Microsoft Research Z3 Documentation page, retrieved at <<http://research.microsoft.com/en-us/um/redmond/projects/z3/documentation.html#papers>>, retrieved on Apr. 20, 2010, Microsoft Corporation, Redmond, WA, 3 pages.
Gal, A. et al.; "HotpathVM: An Effective JIT Compiler for Resource-constrained Devices"; Proceedings of the 2nd International Conference on Virtual Execution Environments, 2006; pp. 144-153.
Tillman et al., "The Unthinkable: Automated Theorem Provers for (Tracing) Just-in-Time Compilers", Retrieved from: <<http://csl.stanford.edu/~christos/pldi2010.fit/tillmann.provers4jit.pdf>>, In Fun Ideas and Thoughts Session at the 2010 Conference on Programming Language Design and Implementation, Jun. 9, 2010.
Schulte et al., "Automatic Parallelization of Programming Languages: Past, Present and Future", In Proceedings of the 2010 International Workshop on Multicore Software Engineering, May 2010.
Bebenita et al., "SPUR: A Trace-Based JIT Compiler for CIL", Technical Report No. MSR-TR-2010-27, Retrieved from: <<http://research.microsoft.com/pubs/121449/techreport2.pdf, Mar. 25, 2010.
Phillepsen et al., "Double Inspection for Run-Time Loop Parallelization", In Proceedings of the 24th International Workshop on Languages and Compilers for Parallel Computing, Sep. 8-10, 2011.
Bebenita et al., "SPUR: A Trace-Based JIT Compiler for CIL", Proceedings of the ACM International Conference on Object Oriented Programming Systems Languages and Applications, pp. 708-725, Oct. 17-21, 2010.

* cited by examiner

AUTOMATIC PARALLELIZATION IN A TRACING JUST-IN-TIME COMPILER SYSTEM

BACKGROUND

Language compilers can be configured to automatically generate code which parallelizes processing performed by a loop, providing a form of static compile-time parallelization. A system which runs this code can allocate different loop iterations to different processing resources (e.g., different threads or different processing cores on a single or multiple central processing units (CPUs)). The processing resources can operate on their respective tasks in a parallel manner to thereby expedite processing. However, compile-time parallelization techniques (which are applied before code is executed) face significant challenges in performing this task. For instance, a language compiler often lacks sufficient information to determine whether it is worthwhile to parallelize a loop. Further, a language compiler often lacks sufficient information to determine whether it is safe to parallelize a loop. In many cases, for example, loop iterations are dependent on other loop iterations. In these scenarios, the iterations are not parallelizable. However, the language compiler often has insufficient information to determine whether a loop has these non-parallelizable characteristics. Due to these limitations, the language compiler may opt to take a conservative approach in parallelizing code. This solution, however, may fail to provide significant gains in expediting the execution of the program.

SUMMARY

An illustrative tracing just-in-time (TJIT) compiler system is described for providing automatic parallelization of code during a runtime phase of execution, rather than a static language compilation phase. Upon detecting a "hot" loop during the execution of the code, the TJIT compiler system extracts trace information from at least one trace produced by processing the loop in a sequential manner. In a first phase, the compiler system uses the trace information to identify at least one group of operation components that can be operated on in a parallel manner. The operation components, for instance, may correspond to processing operations performed on elements of a data structure in the course of running the loop. In a second phase, the compiler system provides instructions which allocate the operation components in the group to plural processing resources. A native code generator module carries out those instructions, e.g., by recompiling the code to achieve the instructed parallelization, and passing the resultant native code to the plural processing resources.

The TJIT compiler system can effectively parallelize code because it extracts information about what is actually happening during the processing of the program (as learned from the traces). This information is significantly more robust than information that can be learned during a static language-compilation phase. For example, the TJIT compiler system can examine trace information to successfully determine whether an object that is referenced by an operation component accesses a memory location associated with another operation component (from another iteration).

According to one illustrative aspect, the TJIT compiler system forms a group of parallelizable operation components in piecemeal fashion by determining whether each operation component added to the group satisfies a parallelization test with respect to other operation components already in the group. When this test fails, the TJIT compiler system can begin forming another group. The TJIT compiler system can iteratively perform this procedure until an entire loop, from its lower to its upper bound, is processed.

According to another illustrative aspect, the TJIT compiler performs its parallelization test based on predicate information and access information provided by trace information. The predicate information expresses a condition associated with the normal execution of a particular execution path of the loop body for a particular iteration. The access information expresses memory location(s) that are accessed by an iteration associated with a particular iteration.

According to another illustrative aspect, the TJIT compiler system can successively form aggregate predicate information by combining predicate information extracted from different traces (corresponding to different execution paths exercised by different respective iterations). By doing so, the TJIT compiler system can successively build a more complete understanding of the nature of a loop; if the number of execution paths through the loop body is finite, an entirely complete understanding can eventually be gathered. The aggregate predicate information provides a reference against which additional instances of loop iterations can be compared for compliance. Represented as a logical formula, aggregate predicate information is the disjunction of individual predicates.

According to another illustrative aspect, the TJIT compiler system can interact with a theorem prover module to perform any of the analysis described above. For example, the TJIT compiler system feeds the theorem prover module aggregate predicate information and aggregate access information for a group of operating components under consideration. The theorem prover module can operate on this input information in the logical domain to determine whether this group can be parallelized. The theorem prover module can also operate on this input information in the logical domain to simplify the predicate information, for example by identifying redundant sub-predicates that are implied by other sub-predicates. Similarly for the access information, the theorem prover module may identify sub-accesses that are included in other sub-accesses.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative tracing just-in-time (TJIT) compiler system that performs automatic parallelization of code during a runtime phase of execution of the code. Section B describes illustrative methods which explain the operation of the compiler system of Section A. Section C describes illustrative processing functionality that can be used to implement any aspect of the features described in Sections A and B.

Figure 11:
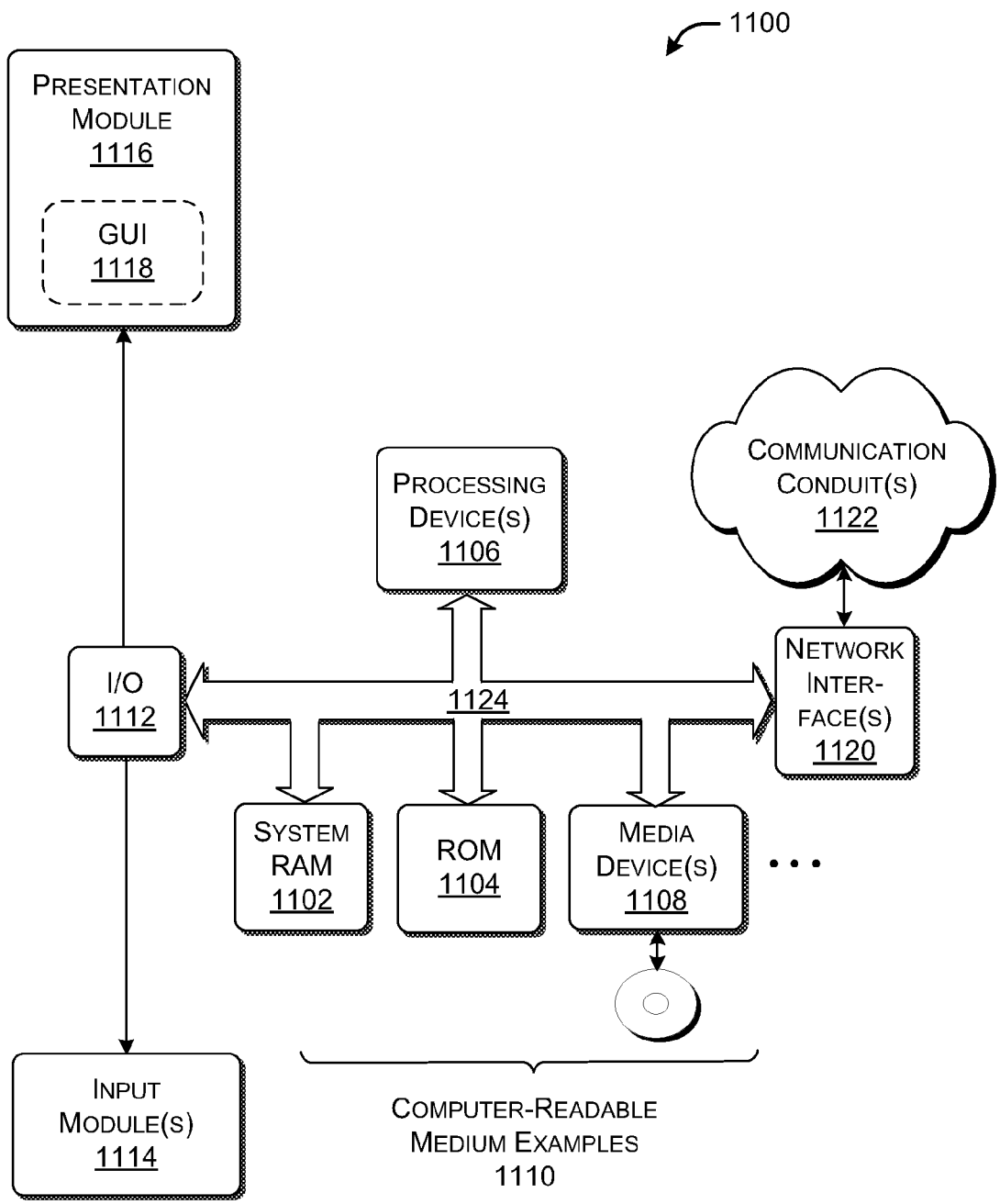
FIG. 11 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 11, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" or the like encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not to be interpreted as an exhaustive indication of features that can be duplicated. Finally, the terms "exemplary" or "illustrative" refer to one implementation among potentially many implementations.

A. Illustrative Systems

A.1. Tracing JIT Compiler System Overview

Figure 1:
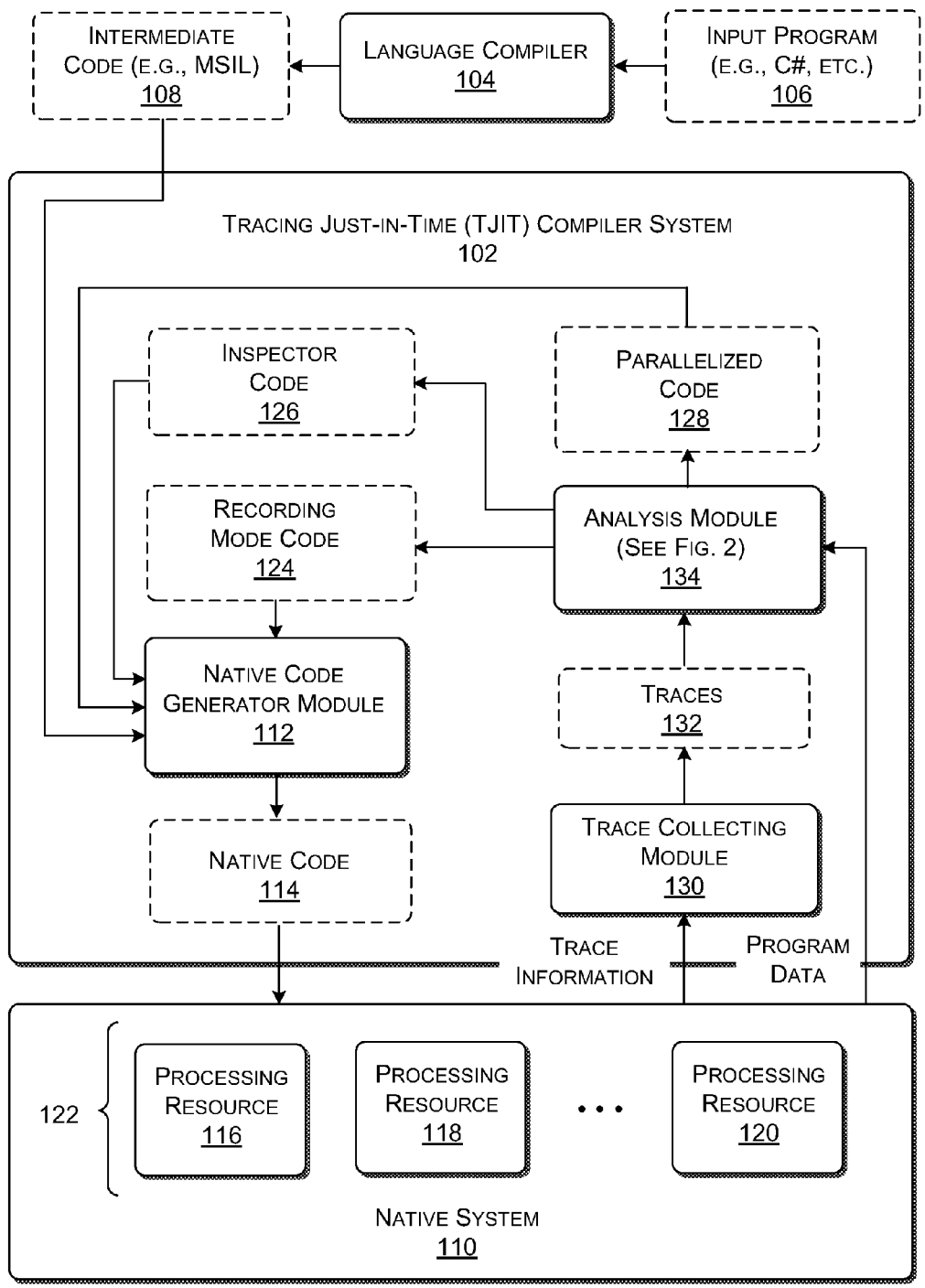
FIG. 1 shows one implementation of a tracing just-in-time (TJIT) compiler system that performs automatic parallelization of code during a runtime phase of execution of the code.

FIG. 1 shows one implementation of a tracing just-in-time (TJIT) compiler system 102 for automatically parallelizing code during a runtime phase of code execution. Generally, the illustrative implementation shown in FIG. 1 corresponds to a virtual machine environment. Without limitation, in such an environment, a language compiler 104 converts an input program 106 into platform-generic intermediate code 108. The TJIT compiler system 102 then converts the intermediate code 108 into native code (e.g., machine code) for execution by a native system 110 of a particular type. The TJIT compiler system 102 performs this conversion on an as-needed basis (e.g., a just-in-time basis). This is in contrast to traditional compiler systems which convert an entire input program to executable code in an upfront and static manner, and then runs the executable code. The following explanation will set forth each component of the TJIT compiler system 102 in detail, focusing on the features that enable the TJIT compiler system 102 to parallelize code in the runtime phase of execution.

To begin with, the TJIT compiler system 102 can accept the input program 106 expressed in any language (after it has been compiled by a language compiler 104 into intermediate code 108). In one case, the input program 106 is expressed in a language that accommodates dynamic data structures, such as arrays, lists, trees, etc. The execution of this kind of input program 106 involves the dynamic allocation of memory. Further, in one case, the input program 106 can be expressed in an object-oriented language, such as C#, Java, Javascript, Python, Ruby, etc. In other cases, the input program 106 can be expressed in a non-object-oriented language, such as C, etc.

The language compiler 104 can use conventional techniques to convert the input program 106 into the intermediate code 108. For example, the intermediate code 108 can correspond to Microsoft Intermediate Language (MSIL) code used in the context of Microsoft's .NET framework (provided by Microsoft® Corporation of Redmond, Wash.), or to bytecode used in the context of Sun System's Java VM Framework (now provided by Oracle® Corporation of Redwood City, Calif.). A native code generator module 112 then converts the intermediate code 108 into native code 114 in a just-in-time manner.

The native system 110 corresponds to any platform for executing the native code 114 provided by the native code generator module 112. For example, the native system 110 can correspond to any computing device (or devices) that includes any hardware functionality that is governed by any operating system. In the present context, the native system 110 provides plural processing resources (e.g., processing resources 116, 118, . . . 120), collectively referred to as processing resources 122. In one case, the processing resources 122 can correspond to separate physical processing cores. In another case, the processing resources 122 can correspond to different processing threads. In another case, the processing resources 122 can correspond to a combination of different physical and software-implemented processing resources. In any case, any two or more of these processing resources 122 can perform operations in parallel when commanded to do so. Suppose, for example, that a loop involves 1000 iterations that can be parallelized; further assume that the native system 110 includes two processors. The TJIT compiler system 102 can split these iterations between the two processors in any manner based on any parallelization strategy. These processors can then operate on their respective assigned tasks at the same time, that is, in parallel.

More specifically, the native system 110 can execute the native code 114 in various modes. For each mode, the native code generator module 112 receives a particular version of intermediate code. Each version is configured to carry out different tasks. The native code generator module 112 operates on these different versions to produce different corresponding versions of the native code 114. Each version of the native code 114 is instrumented in a different respective manner Sequential Normal Execution Mode.

In this case, the native code generator module 112 receives the intermediate code 108 and transforms it into native code 114. The native system 110 operates on this version of the native code 114 in a sequential "normal" manner, to thereby formally carry out the operations specified by the input program 106 (as converted to the intermediate code 108).

Trace-Recording Mode.

In this case, the native code generator module 112 receives recording mode code 124 and transforms it into native code 114. The native system 110 can process this version of the native code 114 in a serial manner to collect traces that describe the operation of the program. In one implementation, the native system 110 performs the actual computations in the program while collecting a trace. In another implementation, the native system 110 may not apply all side effects associated with the program (for example, by not applying write operations to shared memory). Each trace refers to a sequence or stream of instructions that implement one specific execution path within a loop body of a program (among other possible execution paths).

Inspector Mode.

In this case, the native code generator module 112 receives the inspector code 126 and transforms it into native code 114. The native system 110 operates on this version of the native code 114 to investigate characteristics of a loop operation without formally executing the program (and without recording a trace). The TJIT compiler system 102 can investigate the properties of the loop in this manner because it is efficient. However, the JIT compiler system 102 can perform this same investigative function in other ways, such by analyzing code in the manner of an interpreter.

Parallel Execution Mode.

In this case, the native code generator module 112 receives parallelized code 128 and transforms it into native code 114. This version of the native code 114 instructs the native system 110 to operate on the iterations of a loop in a parallel manner, e.g., using the processing resources 122 to operate on iterations in a concurrent manner.

A trace collecting module 130 receives and collects the traces provided by the native system 110. More specifically, during the trace-recording-mode execution of a loop, the trace collecting module 130 can collect one or more traces 132 that correspond to respective iterations of the loop body. That is, each trace may correspond to a sequence of instructions performed in that iteration. The trace collection module 130 can demarcate the beginning and end of each loop-related trace in any manner. In one case, the trace collecting module 130 can determine the start of an iteration when it detects the appearance of a marker item in the trace (where the marker item has been added to the code by the native code generator module 112). The trace collecting module 130 can detect the end of a loop iteration based on branching-behavior exhibited by the trace, e.g., where the program loops back to a start of the loop. Alternatively, the trace collecting module 130 can consider an iteration as having ended when the trace exceeds a prescribed maximum length, with respect to the beginning of the iteration.

In one case, the TJIT compiler system 102 invokes the trace collecting module 130 to collect at least one loop-related trace when it detects the runtime execution of a "hot loop." The TJIT compiler system 102 can use any combination of factors to identify a hot loop. In one case, the TJIT compiler system 102 identifies a loop as hot if it includes a number of iterations that exceeds some specified threshold number (to distinguish it from loops which do not have a significant number of iterations, and therefore are not good candidates for optimization or parallelization). Different agents in the TJIT compiler system 102 can make this assessment, such as the native code generator module 112 and/or an analysis module 134.

The analysis module 134 receives the traces 132 that are collected from the trace collecting module 130. The analysis module 134 performs various operations based on the traces. For example, suppose that the TJIT compiler system 102 has detected the runtime execution of a hot loop. In response, the analysis module 134 can receive one or more loop-related traces from the trace collecting module 130 corresponding to respective iterations of the loop. The analysis module 134 can extract trace information from these traces. It uses this information to determine whether or not to parallelize at least part of the loop. This question, in turn, has two components. The TJIT compiler system 102 can determine whether it is worthwhile to parallelize the loop. Second, the TJIT compiler system 102 can determine whether it is safe to parallelize the loop. Further detail on these operations appears below in Section A.2 and Section B.

The analysis module 134 addresses the safety issue by identifying at least one group of processing loop-related tasks to be performed in parallel (in a two-stage manner described below). The analysis module 134 can then provide instructions regarding its decision. In one case, the analysis module 134 can formulate its instructions as the parallelized code 128. The parallelized code 128 represents a modified version of the original intermediate code 108. The parallelized code 128 differs from the original intermediate code 108 because it provides instructions that carry out a loop in a parallel manner, rather than as a linear sequence of instructions.

The native code generator module 112 receives the parallelized code 128 and compiles it into native code 114. This compilation can be viewed as a recompilation with respect to the original compilation of the intermediate code into native code 114. The native code generator module 112 then sends the recompiled native code 114 to the processing resources 122, which carry out the tasks specified therein in a parallel manner.

An overview of the operation of the TJIT compiler system 102 now follows. The TJIT compiler system 102 toggles between two phases as it processes a loop. In a first phase, the TJIT compiler system 102 investigates the characteristics of the loop, with the ultimate aim of determining whether the loop can be parallelized. The TJIT compiler system 102 performs this task using two mechanisms, providing by the trace-recording mode and the inspector mode, respectively. In the trace-recording mode, the TJIT compiler system 102 drives the native system 110 to process the native code 114 in a serial manner. As explained, the TJIT compiler system 102 performs this task to collect at least one trace that describes the behavior of a loop within the program. The TJIT compiler system 102 can also process the native code 114 in the inspector mode to further investigate the characteristics of the loop (without recording traces).

In the second phase, the TJIT compiler system 102 drives the native system 110 to execute the native code 114 in either the normal (sequential) execution mode or the parallel execution mode (based on the compiled version of the parallelized code 128, if, in fact, it has been determined that the loop can be parallelized).

At any given time, the native system 110 can be performing different tasks with respect to different parts of the code. For example, the native system 110 can be operating in the trace-recording mode to forward prospective information regarding one part of the code. At the same time, the native system 110 can be operating in the normal execution mode or the parallel execution mode to formally carry out the computations of another part of the code containing looping behavior, e.g., in either a sequential mode of operation or a parallel mode of operation (based on decisions made by the analysis module 134).

Viewed from a more encompassing perspective, the TJIT compiler system 102 executes a program by compiling it in piecemeal (just-in-time) fashion. As a default, the TJIT compiler system 102 sends native code 114 to the native system 110 that executes the operations in a sequential manner (in the normal execution mode). When the TJIT compiler system 102 detects the presence of a hot loop, it directs the trace collecting module 130 to collect at least one trace that describes the behavior of the loop. Based on the trace information, together with any insight gleaned from the inspector mode, the TJIT compiler system 102 examines the behavior of the loop. If the TJIT compiler system 102 determines that at least part of the loop can be parallelized, it produces recompiled native code 114 which directs the native system 110 to execute that part of the loop in a parallel mode of operation.

More specifically, as stated above, the TJIT compiler system 102 can examine the loop in piecemeal fashion using a two-part approach. In a first phase, the TJIT compiler system 102 determines whether it is possible to parallelize part of the loop. In the second phase, the TJIT compiler system 102 implements this parallelization (if it is concluded that the part can be parallelized). Again, recompilation entails producing recompiled native code that carries out the instructions to parallelize the loop operations.

For example, the TJIT compiler system 102 may begin its analysis by determining whether it is possible to parallelize the first m iterations of the loop, where m can have any value, selected based on any consideration or combination of considerations. For example, m may correspond to a "chunk" size that can be handled by the processing resources 122 at any given time. The TJIT compiler system 102 may conclude that it is possible to parallelize these m iterations. If so, the TJIT compiler system 102 can selectively send recompiled instructions to the native system 110 which instruct it to process this part of the loop in a parallel manner. The TJIT compiler system 102 then performs this same two-part processing with respect to the next m iterations of the loop. As can be appreciated, the TJIT compiler system 102 can therefore parallelize the loop in a rolling manner until the last loop iteration is reached.

It may happen that the TJIT compiler system 102 determines that only the first n iterations of the loop can be parallelized, where n<m. If so, the TJIT compiler system 102 provides instructions which parallelize these n iterations. Starting from iteration n+1, the TJIT compiler system 102 then investigates whether the next m iterations can be parallelized, and so on. Hence, the characteristics of the loop itself may determine the manner in which the TJIT compiler system 102 partitions the loop. In general, the TJIT compiler system 102 can be said to partition the loop into groups of tasks corresponding to respective iterations. In the extreme case, the TJIT compiler system 102 can determine that no iteration in the loop can be parallelized (for reasons to be described below). This case devolves into a sequential mode of execution, where the "group" size corresponds to n=1. In one implementation, the TJIT compiler system 102 may carry out the above-described parallelization analysis by, in part, passing inspector code 126 to the native system 110 in the manner described above.

A.2. Analysis Module

Figure 2:
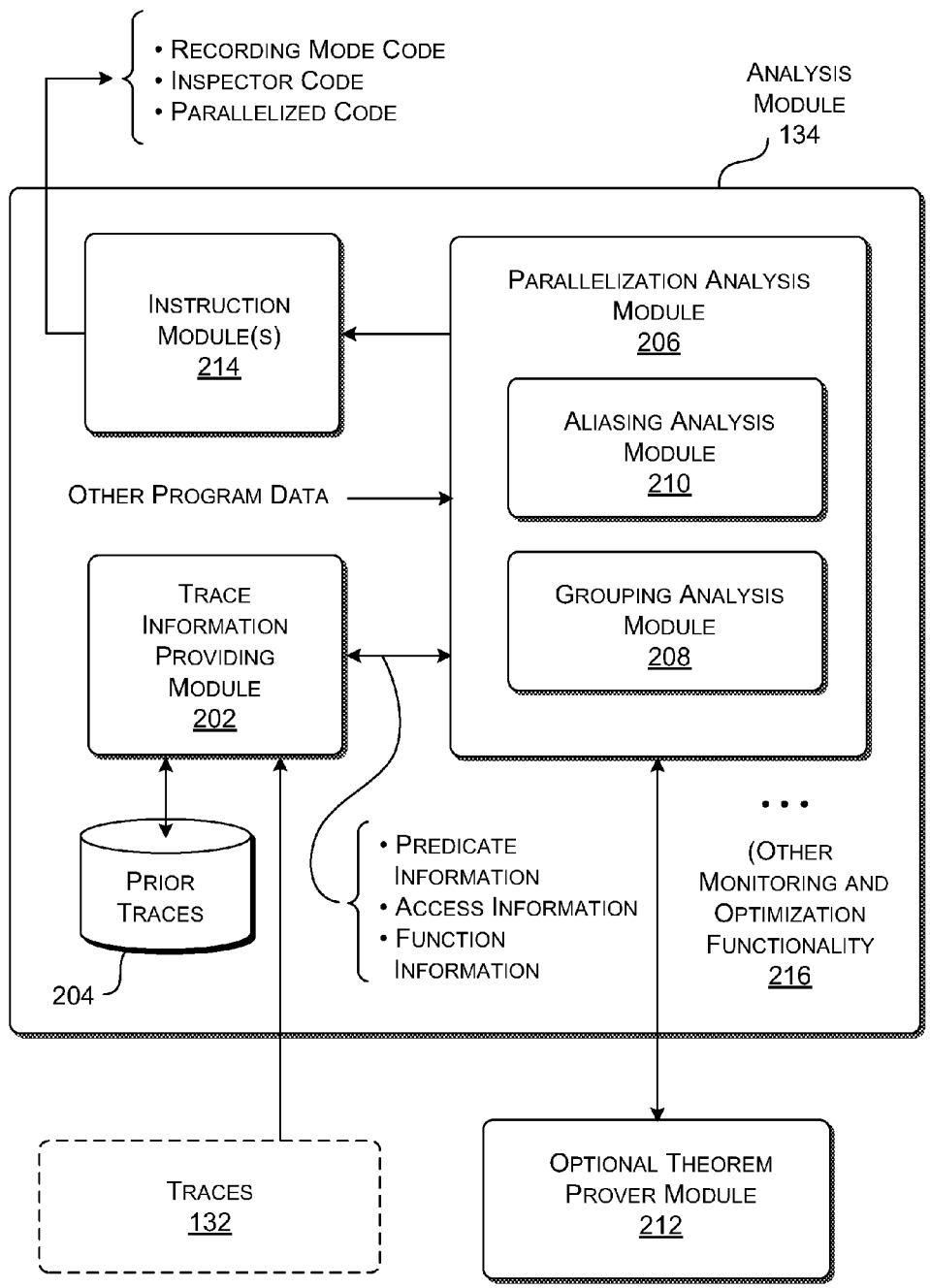
FIG. 2 shows an illustrative analysis module for use in the TJIT compiler system of FIG. 1.

FIG. 2 shows a more detailed view of one implementation of the analysis module 134, introduced in FIG. 1. The analysis module 134 can include (or can be conceptualized to include) a number of sub-components. This section first introduces each of these components. Later explanation will provide additional details regarding these components in the context of a series of examples.

More generally, FIG. 2 describes different analysis-related functions performed by the environment shown in FIG. 1. In one case, these analysis functions can be collocated in a single "module" as shown in FIG. 2 and referred to as the analysis module 134. However, in another case, the analysis functions can be distributed over the environment shown in FIG. 1. For example, one or more of the analysis operations shown in FIG. 2 can be performed by the native system 110. The native system 110 can be instructed to perform these functions based on instrumented code supplied to it by the TJIT compiler system 102. Hence, the concept of the "analysis module" 134 is to be understood as an aggregation of certain analysis functions that can be physically implemented in different ways.

To begin with, a trace information providing module 202 receives traces 132 from the native system 110 in the trace-recording mode of operation. These traces, as said, reflect respective sequences of instruction paths through the code. The trace information providing module 202 can extract various information items from the traces, collectively referred to as trace information. The trace information providing module 202 can store the trace information in a data store 204. The trace information providing module 202 makes this trace information available to a parallelization analysis module 206. The parallelization analysis module 206 uses the trace information to determine whether it is appropriate to parallelize a loop, in whole or in part.

For example, assume that the trace information providing module 202 is processing a particular trace at a particular point in time; that trace is referred to herein as a "current" trace to distinguish it from previously encountered traces. The current trace is associated with a particular iteration of a loop, referred to as a current iteration to distinguish it from previously encountered iterations. The trace information providing module 202 can extract predicate information, access information, and function information from the current trace. Each of these information items may be qualified by "current" to distinguish it from previous instances of this information.

Predicate information expresses a condition that ensures that the current iteration will execute in a normal fashion along a particular execution path. The predicate information may correspond, for instance, to a conditional statement within the code of the loop. The access information describes one or more memory locations accessed by the current iteration of the loop. These accesses may refer to reads and/or writes. The function information describes an operation that is carried out by the current iteration. More specifically, the function information can describe a transformation from one state to another that is carried out by the current iteration of the loop.

In one implementation, the trace information providing module 202 stores the trace information in a generic parameterized form. For example, the predicate information, access information, and function information are expressed in terms of a generic iteration index (or plural indices, if appropriate). As will be described, the analysis module 134 can determine whether the program data of a current iteration matches a previously encountered instance of predicate information (associated with a previously recorded trace). If so, the analysis module 134 can apply the generic access information and function information for that past trace to the current iteration. Hence, the TJIT compiler system 102 does not need to record a trace for each iteration.

From a high-level perspective, the parallelization analysis module 206 seeks to determine at least one group of operation components that can be performed in a parallel manner. As used herein, an "operation component" refers to a task associated with a loop iteration. For example, consider the object-oriented case in which a program repeats some operation over the elements of a data structure, such as an array, linked list, graph, tree, etc. Each such operation that is performed is performed with respect to a particular iteration. And each such operation itself comprises an operation component. More specifically, the operation component affects a transition from a first state (before the operation component is performed) to a second state (after the operation component is performed). This transformation can be gleaned from information provided in the trace. That information is referred to as function information.

The parallelization analysis module 206 can build a group of operation parallelizable components in a successive piecemeal fashion. For example, when processing a second operation component, the parallelization analysis module 206 determines whether this component involves a task which conflicts with a first-processed operation component. When processing a third operation component, the parallelization analysis module 206 determines whether this component conflicts with the first and second operation components. So long as there is no conflict, the parallelization analysis module 206 continues aggregating operation components into the group. When there is a conflict, the parallelization analysis module 206 "closes" the group and starts another group of parallelizable operation components. In some implementations, the parallelization analysis module 206 can also truncate a group when it reaches some size criterion m. The above-described analysis may be carried out via the inspector code 126 that is generated and sent to the native system 110 for execution.

The parallelization analysis module 206 groups operation components together by performing two types of checking, predicate-related checking and access-related checking. Passing the predicate-related checking operation is a condition for performing the access-related checking operation.

Figure 5:
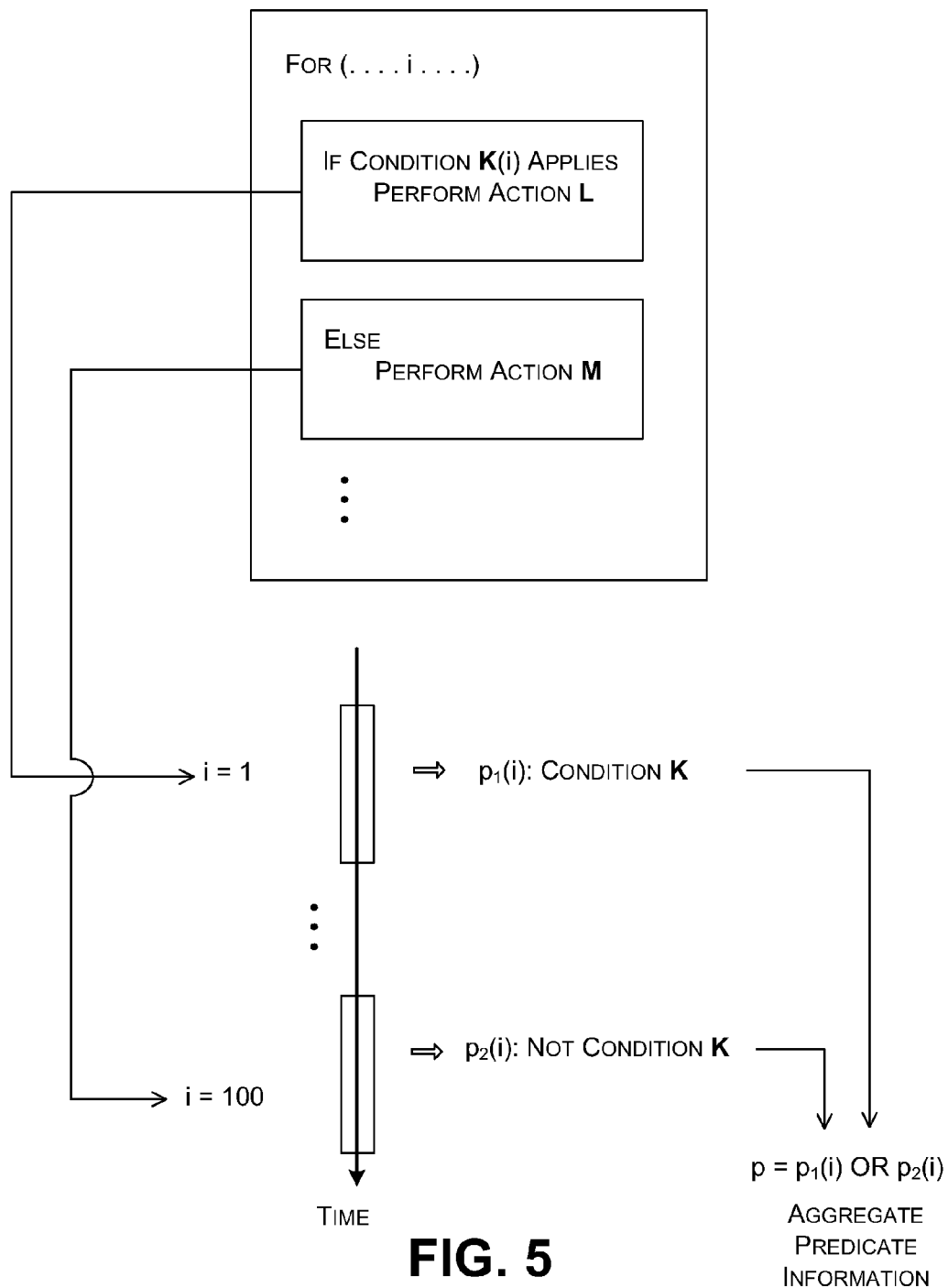
FIG. 5 shows an example of how the TJIT compiler system of FIG. 1 can form accumulated predicate information.

In the predicate-related checking, the parallelization analysis module 206 determines whether a current iteration under consideration includes program data which is consistent with previously encountered predicate information. If so, the parallelization analysis module 206 advances to the access-related checking. If not, the parallelization analysis module 206 closes the group being formed. FIG. 5 serves as a vehicle for explaining this operation in greater detail (below).

Figure 4:
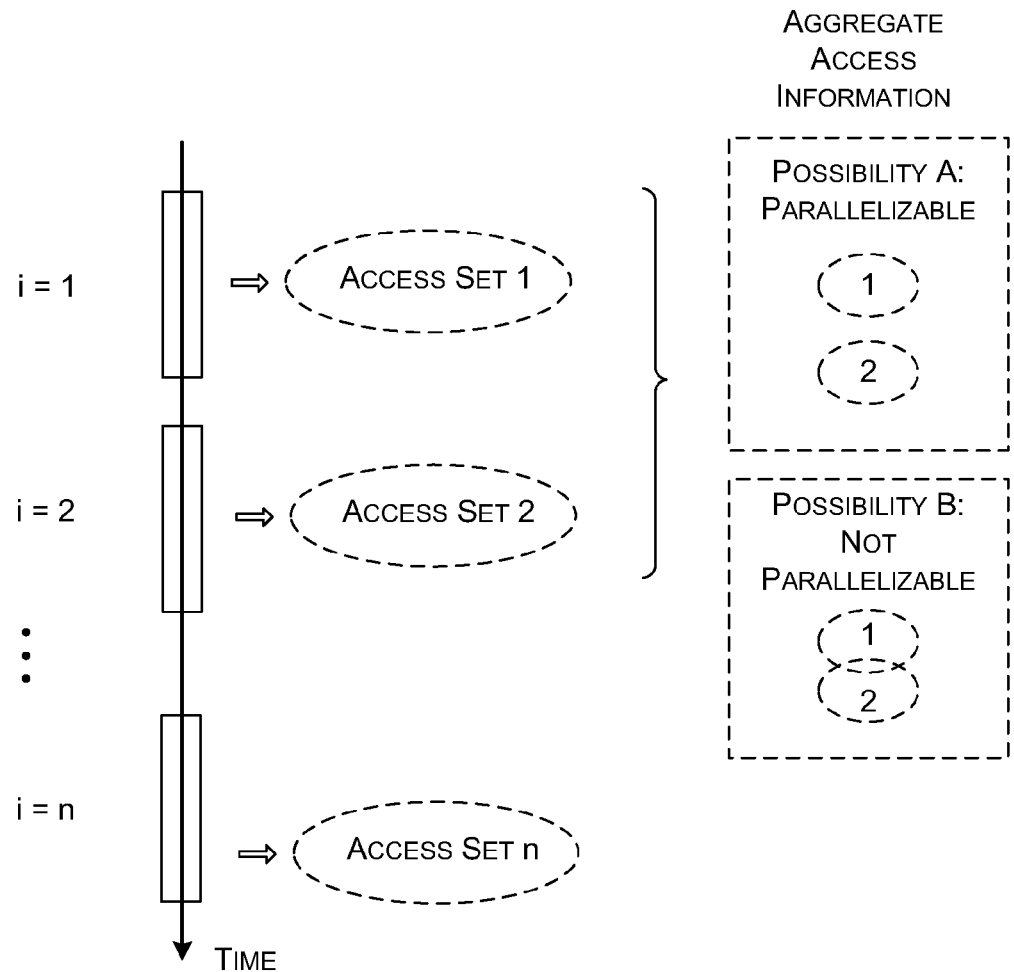
FIG. 4 shows an example of how the TJIT compiler system of FIG. 1 can form accumulated access information.

In the access-related checking, the parallelization analysis module 206 determines whether a current iteration under consideration involves a memory access which conflicts with memory accesses associated with the group being formed. There is a conflict when the operation components associated with plural iterations are not independent of each other, and therefore cannot be performed in parallel. For example, in one type of dependency, the operation performed in a current iteration may make reference to an operation performed in a preceding iteration. In another type of dependency, the operation performed in a current iteration may make reference to an operation performed in a future iteration. These types of iterations preclude parallelization because they are linked together and involve reference to the same memory location(s). In another type of dependency, the operations performed in two or more iterations write to the same memory location(s). This scenario is a poor candidate for parallelization because the final outcome of this operation will depend on unpredictable race conditions (that is, if it is performed by two unsynchronized processing resources). In generally, conflicts may take the form of read/write conflicts (where a read to memory may interfere with a write to memory) and write/write conflicts (where a write to memory may interfere with another write to memory). FIG. 4 serves as a vehicle for explaining the access-related checking operation in greater detail (below).

The parallelization analysis module 206 includes a grouping analysis module 208 that performs the type of checking summarized above. An aliasing analysis module 210 performs analysis to determine the mapping between variables and memory locations. This allows the dependency analysis module 208 to more effectively determine whether different iterations are accessing the same memory locations.

The parallelization analysis module 206 can perform the conflict analysis using different mechanisms. In one case, the parallelization analysis module 206 can provide logic which implements dependency checking, e.g., by making reference to a data store of rules. Alternatively, or in addition, the parallelization analysis module 206 can perform the conflict analysis with the assistance of a theorem prover module 212. The theorem prover module 212 receives input information from the parallelization analysis module 206 which expresses the constraints to be considered in determining whether a conflict is present. The input information may include the predicate information and the access information for a particular group of operation components under consideration. Such input information is formulated in symbolic form, e.g., as a formula to be solved. The theorem prover module 212 performs reasoning on the input information to provide a solution. The solution indicates whether the proposed group of operation components can be combined in a parallelizable group. If not, then the theorem prover module 212 may still be employed to simplify the predicate information, for example by identifying redundant sub-predicates that are implied by other sub-predicates. Similarly for the access information, the theorem prover module 212 may identify sub-accesses that are included in other sub-accesses.

Different types of general-purpose theorem prover modules are available in the field, any of which can be used by the analysis module 134 of FIG. 2. For example, the Z3 theorem prover, provided by Microsoft® Corporation of Redmond, Wash., can be used to implement the theorem prover module 212 of FIG. 2. The Z3 theorem prover is described in various publications, including: Leonardo de Moura, et al., "Z3: An Efficient SMT Solver," in *Tools and Algorithms for the Con-*

*struction and Analysis of Systems*, Vol. 4963/2008, Apr. 3, 2008, pp. 337-340. Other theorem prover modules include: Alt-Ergo, Ario, Barcelogic, Beaver, Boolector, CVC, CVC Lite, CVC3, DPT (Intel), ExtSAT, Harvey, HTP, ICS (SRI), Jat, MathSAT, OpenSMT, Sateen, Simplify, Spear, STeP, STP, SVC, Sword, TSAT, UCLID, etc.

In one implementation, the analysis performed by the theorem prover module 212 can be performed concurrently with the execution of the code using the native code generator module 112. This means that the analysis performed by the theorem prover module 212 need not delay the execution of a loop.

An instruction module 214 formulates instructions to be sent to the native code generator module 112 which carry out the conclusions of the parallelization analysis module 206 (e.g., regarding what operation components can be parallelized). For example, the instruction module 214 can modify the original intermediate code 108 to produce its parallel-version counterpart, i.e., the parallelized code 128. The native code generator module 112 recompiles the code based on the parallelized intermediate code to provide native code 114, which it sends to the native system 110. That native code 114 directs the native system 110 to execute the loop in a parallel manner using the processing resources 122.

The instruction module 214 formulates the parallelized code 128 in such a manner that the code implements the transformations described in the loop iterations being parallelized. To repeat, the trace information providing module 202 extracts knowledge of these transformations from the traces in the form of function information. Note that the parallelized code 128 (and resultant native code 114) is parameterized so that it applies to all of the loop iterations within a parallelizable group. That is, the parallelized code 128 uses one or more indices to represent a collection of iterations.

FIG. 2 also indicates that the analysis module 134 can include other monitoring and optimization functionality 216 (not specifically enumerated herein). This optimization functionality 216 can help expedite the execution of loops in other ways (besides parallelizing the loops).

Figure 3:
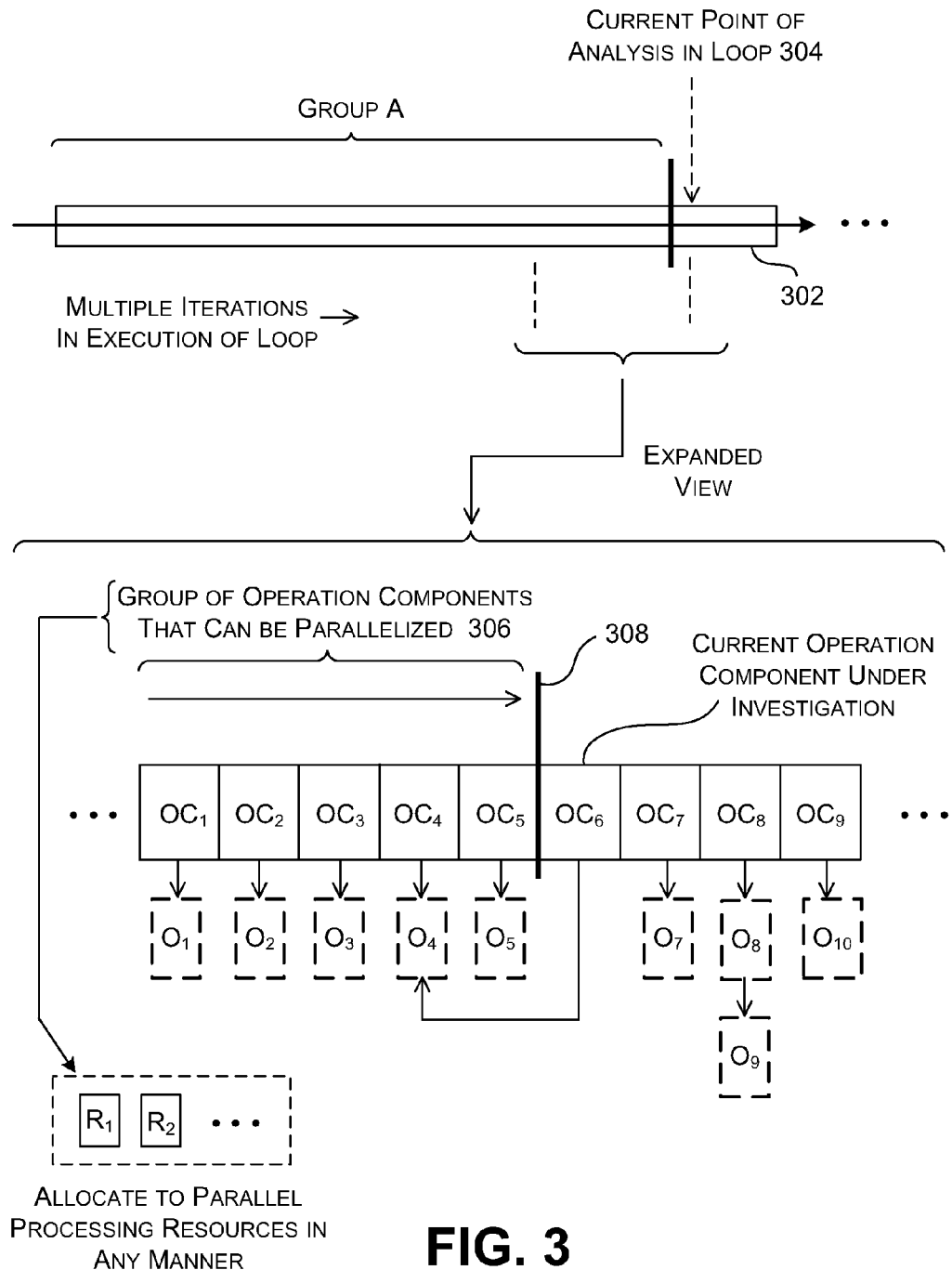
FIG. 3 shows an example of how the TJIT compiler system of FIG. 1 can partition operation components associated with a loop into one or more groups; each group can then be processed using plural processing resources which operate in a concurrent manner.

FIG. 3 provides additional information regarding the analysis operations performed by the analysis module 134. In this example, assume that the TJIT compiler system 102 has detected a "hot" loop and is in the process of determining groups of parallelizable operation components within the loop (if any). FIG. 3 illustrates the loop as a series of operations along a time axis. In other words, an extended bar 302 of FIG. 3 represents a sequence of iterations in the loop that may be investigated in succession. The trace collecting module 130 furnishes information regarding these iterations, e.g., as gleaned from the trace-recording-mode processing of at least one of the loop iterations.

At the current point 304 of analysis, the analysis module 134 has already processed a group 306 of operation components. Assume, for example, that each of the operation components ($OC_1$, $OC_2$, . . . ) in the group 306 makes reference to respective objects ($O_1$, $O_2$, . . . ). Further assume that all of the objects are independent. For this reason (in part), the analysis module 134 has determined that the operation components in the group 306 can be parallelized. The analysis module 134 reaches this conclusion in successive fashion based on trace information that it has collected based one or more previously recorded traces. That is, as will be explained more fully in Section B, the TJIT compiler system 102 collects a new trace (and extracts trace information therefrom) when the program data for a particular loop iteration cannot be matched to any previously extracted predicate information. The analysis module 134 draws from this predicate information (stored in data store 204), in conjunction with program data supplied through inspector mode processing, when performing its parallelization analysis.

More specifically, as already explained, upon receiving the second operation component ($OC_2$), the analysis module 134 determines whether it conflicts with the first operation component ($OC_1$); upon receiving the third operation component ($OC_3$), the analysis module 134 determines whether it conflicts with the first and second operation components ($OC_1$, $OC_2$), and so on. This conflict checking, in turn, has two aspects. In a first aspect, the analysis module 134 determines whether the program data associated with a current iteration under consideration is consistent with any previously encountered instances of predicate information. In a second aspect, the analysis module 134 determines whether the access information of an iteration under consideration conflicts with the access information associated with the prior iterations in the group.

At a current point 304 of analysis, the analysis module 134 is in the process of determining whether operation component ($OC_6$) can be added to the existing group 306. Presume that the predicate check has passed. As to the access check, $OC_6$ makes reference to object $O_4$, for example by means of a read access. $OC_4$ also makes reference to object $O_4$, for example by means of a write access. This means that both $OC_6$ and $OC_4$ make reference to the same memory location, by means of read and write accesses. Hence, the analysis module 134 determines that the access check fails, and thus, $OC_6$ cannot be added to the group 306.

In response to this conclusion, the analysis module 134 "closes" the membership of the group 306. If this is the first time when this loop is to be processed in parallel, then the analysis module 134 then sends instructions which prompt the recompilation of code to accomplish the parallel processing of the operation components in the group 306. The analysis module 134 then also starts forming a second group, the first member of which is $OC_6$. (Or, in another case, the JTIT compiler system 102 performs the iteration associated with $OC_6$ in the sequential recording mode; then, the analysis module 134 begins its investigation of whether another group can be formed, starting with $OC_7$.)

In this example, each operation component makes reference to an object using a single degree of indirection. In other cases, any of the operation components can include a chain of indirections. For example, $OC_8$ makes reference to object $O_8$, and object $O_8$, in turn, makes reference to object $O_9$. Accordingly, the analysis module 134 may discover a conflict that is highly embedded in a chain of references. On the other hand, all such dependencies are hidden from the perspective of a static language compiler.

In summary, the analysis module 134 can be said to perform an iterative investigation based on trace information. In doing so, it successively advances a group boundary 308 until its parallelization test fails. As said, the analysis module 134 can also "close" a group based on any other factor or combination of factors. For example, the analysis module 134 can terminate its group-forming operation when the group achieves a predetermined size. The size, in turn, may be selected based on a consideration of the processing capacity of the plural processing resources 122.

The TJIT compiler system 102 can allocate the operation components in a group to the processing resources 122 of the native system 110 based on any parallelization strategy, such as a strip-mining strategy and/or a stride-mining strategy. In a strip-mining technique, the TJIT compiler system 102 can allocate operation components into contiguous sections. For example, if there are three threads to handle the loop, the TJIT compiler system 102 can divide a group of N operation components into three contiguous sections and feed those sections to the three threads. In a stride-mining technique, the TJIT compiler system 102 can give each of the three threads non-contiguous portions of the group to handle.

FIGS. 4 and 5 provide additional information regarding the parallelization test that the analysis module 134 performs in stepwise fashion as it progresses across a sequence of operation components (associated with respective iterations identified by matching traces). More specifically, as stated, the parallelization test can be conceptualized as including two aspects. In a first part, the analysis module 134 can perform predicate-related processing. In a second part, the analysis module 134 can perform access-related processing.

More specifically, the analysis module 134 performs predicate-related checking by receiving predicate information associated with a current iteration under consideration. In one implementation, the analysis module 134 can perform this task by examining program data that is provided in response to the execution of that iteration by the native system 110 in the inspector mode. (That is, for particular program data, the program will take a path through the loop body which can be characterized by predicate information; that predicate information represents the condition (on the program data) under which the program will take that path. In other words, the program data used by a particular loop iteration gives rise to predicate information that characterizes the execution path that the program will take for that program data.) The analysis module 134 then consults the trace information providing module 202 to determine whether the current program data matches any instance of previously encountered predicate information (associated with a previously recorded trace). More specifically, the trace information providing module 202 can store previously encountered instances of trace information in generic parameterized form, which can be compared with later-encountered program data. If the analysis module 134 concludes that there is no match, then the parallelization test fails, upon which the TJIT compiler system 102 invokes the trace-recording mode to collect information regarding the current iteration (including new predicate information that will match the current program data). If there is a match, then the analysis module 134 proceeds with the access-related checking.

Starting with FIG. 4, this figure shows concepts pertaining to access-related processing. In this example, a first iteration of the loop (associated with a first operation component) involves first accesses to memory, identified as access set 1. A second iteration of the loop (associated with a second operation component) involves second accesses to memory, identified as access set 2. Assume that the analysis module 134 seeks to reach the limited conclusion whether the first operation component can be performed in parallel with the second operation component.

The answer to this question can be provided by forming the intersection of the first access set and the second access set. In scenario A, the memory locations accessed in iteration 1 do not intersect the memory locations accessed in iteration 2. This means that these iterations can be parallelized. In scenario B, the memory locations accessed in iteration 1 do at least partially intersect the memory locations accessed in iteration 2. This means that these iterations cannot be parallelized. These conflicts may correspond to read/write conflicts and/or write/write conflicts of any type.

More generally stated, the analysis module 134 operates by receiving current access information for each respective iteration, associated with each corresponding applicable trace. The analysis module 134 determines whether the current access information can be combined with aggregate access information associated with a current group being formed. The aggregate access information represents an aggregation of accesses made by members of the group. In more formal terms, the following logical set equation can be formed to express the intersection of different sets: $A_1 \cap A_2 \cap \ldots \cap A_n = \emptyset$. This expressions means that the group of operation components (including the current operation component) are parallelizable if the intersection of the access sets ($A_1, A_2$, etc) equals the null set. In one implementation, the analysis module 134 can pass this equation to the theorem prover module 212, along with predicate information (discussed next). The theorem prover module 212 can then reach a conclusion as to whether the group can be parallelized based on this input information.

In one implementation, the analysis module 134 can determine the current access information by extracting access information from a previously recorded trace (which matches the predicate information of the current iteration). The access information is expressed in generic parameterized form. The analysis module 134 can instantiate that access information for the current iteration to yield the current access information. This analysis can thus be performed in the inspector mode, until that time that it is determined that a current iteration has program data which does not match any previously encountered instance of predicate information.

FIG. 5 shows concepts pertaining to predicate-related processing, which, as said, is performed prior to access-related processing. In this example, consider the merely illustrative case in which a loop is defined with respect to an index i and includes at least two parts. (In general, a loop can involve any number of indices.) The first part is invoked if a condition K(i) applies, upon which an action L is performed. A second part is invoked if the condition K(i) does not apply, upon which action M is performed. Therefore, a condition that will ensure the normal execution of the first part is an indication that condition K holds true. A condition that will ensure the normal execution of the second part is an indication that K does not hold true.

Assumes that the TJIT compiler system 102 processes at least two iterations of this loop in the trace-recording mode of execution, including a first and hundredth iteration illustrated in FIG. 5. Assume that, in a first iteration, the condition K(i) holds true. Thus, the TJIT compiler system 102 provides a trace which invokes the first part of the loop. In response, the analysis module 134 receives this trace and extracts predicate information that stipulates that K(i) holding true is a condition for normal execution of the loop. Let "trace A" denote this trace; then the predicate of "trace A" is simply "K(i)".

Next assume that, in a second iteration, the condition K(i) does not hold true. Thus, the TJIT compiler system 102 provides a trace which invokes the second part of the loop. In response, the analysis module 134 receives this trace and extracts predicate information associated with the observation that condition K(i) does not hold true. Let "trace B" denote this trace; then the predicate of "trace B" is simply "not K(i)".

The analysis module 134 can combine the first instance of the predicate information (indicating that condition K(i) holds true) with the second instance of the predicate information (indicating that condition K(i) does not hold true) to provide a more encompassing understanding of what it means for the loop to execute normally. Based on this understanding, the analysis module 134 can parallelize future iterations that have program data which is consistent with any part of the more encompassing understanding of the loop.

For example, assume that the TJIT compiler system 102 is processing loop iteration 5 in the inspector mode, before it encounters the new predicate information gleaned from loop iteration 100. In this case, the TJIT compiler system 102 can only parallelize groups of operation components that are consistent with the predicate information gleaned from iteration 1. In contrast, now assume that the TJIT compiler system 102 is processing loop iteration 105 in the inspector mode, after it encounters the new predicate information gleaned from loop iteration 100. In this case, the TJIT compiler system 102 can parallelize groups of operation components that are consistent with either the predicate information gleaned from iteration 1 or iteration 100. More specifically, if the evaluation of the predicate "K(j)" holds for any future loop index j, then "trace A" or "trace B" can be reused for loop index j; this include the access information of "trace A" and "trace B", as well as the function information. In summary, it can thus be said that the analysis module 134 iteratively learns the "contours" associated with a loop upon encountering instances of different loop parts in different traces. The analysis module 134 may have no insight into these different parts until they manifest themselves in execution, and trace-recording passes on the information to the analysis module 134.

Note that if an instance of predicate information in the intermediate code refers to a variable that has been assigned a new value earlier in the same loop iteration, then the assigned value is carried forward into the predicate information of the trace. For example, if the code of the loop body is "x:=i+1; if (x>0) . . . ", then the predicate information is "i+1>0". This general approach to collecting predicates from traces containing assignments is also called symbolic execution. The general concept of symbolic execution is described in literature, e.g., in James C. King, "Symbolic Execution and Program Testing," *Communications of the ACM*, Vol. 19, Issue 7, July 1976, pp. 385-394.

If, for any current iteration, the analysis module 134 determines that the predicate information does not match any previous trace, the analysis module 134 "closes" the group up to the previous iteration, and instructs the native system 110 to process that group in parallel. Then the analysis module 134 will enter the trace-recording mode to record a new trace. The analysis module 134 combines the new predicate information with the previous predicate information to form aggregate predicate information. At any given subsequent time, the analysis module 134 can make conclusions as to whether or not a new operation component can be added to a group based on existing aggregate predicate information associated with that group (as indicated in the above example).

The general approach described above can be extended and/or modified in various ways. According to one additional feature, various operations performed by the analysis module 134 can be split apart and performed in parallel. For example, the analysis module 134 can break the operations of the aliasing analysis module 210 and/or the grouping analysis module 208 into parts and perform these parts in parallel. For example, the grouping analysis module 208 can be configured to check for multiple conflicts at the same time, rather than, or in addition to, sequentially. Alternatively, or in addition, the analysis module 134 can perform aspects of the aliasing analysis module 210 in parallel with aspects of the grouping analysis module 208, and so on.

According to another additional feature, the analysis module 134 can schedule dependencies between tasks when it discovers one or more conflicts. This enables the analysis module 134 to potentially split dependent tasks among different processing resources, providing that synchronization between these dependent parts is taken into account and maintained.

According to another illustrative feature, the analysis module 134 can perform preliminary analysis to identify characteristics of the loop which indicate that parallelization can generally be performed or parallelization can generally not be performed. For example, the analysis module 134 can perform analysis to detect the presence of recurrence relations within a loop that may prevent parallelization for all possible trace manifestations of the loop. In these situations, the analysis module 134 can dispense with the iterative procedure described above, e.g., by either performing parallelization or not performing parallelization based on the outcome of the preliminary analysis. The analysis module 134 can interact with the theorem prover module 212 in performing this preliminary analysis.

According to another illustrative feature, the analysis module 134 can determine dependency information in a static manner. The analysis module 134 can later exploit this information to minimize its conflict checking at runtime. For example, the analysis module 134 can perform the above-described preliminary analysis in a static manner. The analysis module 134 can rely on the theorem provider module 212 in performing this static analysis.

According to another illustrative feature, the analysis module 134 can temporarily store computed information in an array, for example access paths or values loaded from memory which are required to evaluate the predicate, etc. The analysis module 134, or generated inspector code 126, or generated parallelized code 128, can later access this information when needed without re-computing it.

According to another illustrative feature, the analysis module 134 can accommodate the use of inner pointers, and pointers to local variables. Such pointers may arise, for example, in a virtual machine environment, such as the .NET Framework provided by Microsoft Corporation® of Redmond, Wash.

B. Illustrative Processes

FIGS. 6-10 show procedures which explain the operation of the TJIT compiler system 102 in flowchart form. Since the principles underlying the operation of the TJIT compiler system 102 have already been described in Section A, certain operations will be addressed in summary fashion in this section.

Figure 6:
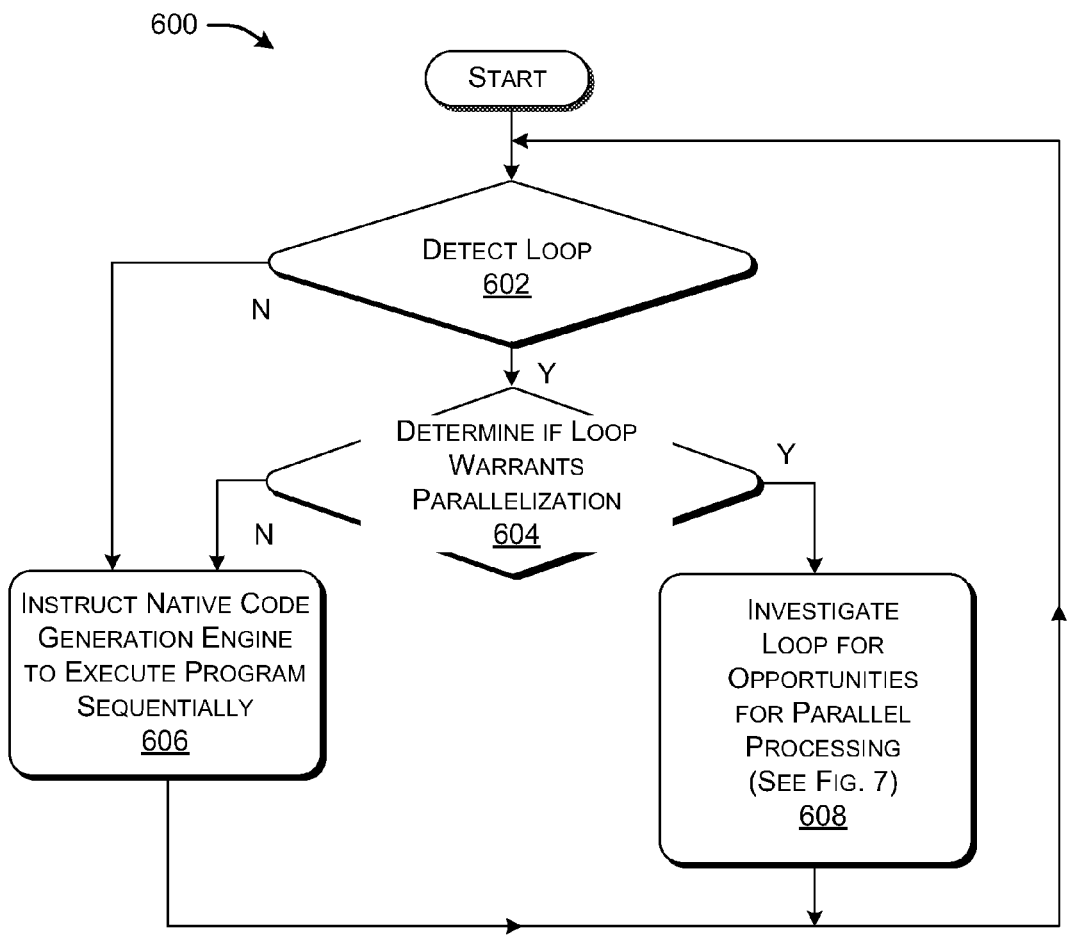
FIG. 6 is a flowchart that shows an overall approach to parallelizing code using the TJIT compiler system of FIG. 1.

Starting with FIG. 6, this figure shows a procedure 600 which represents an overview of the operation of the TJIT compiler system 102. In block 602, the TJIT compiler system 102 detects whether a loop is being performed. The TJIT compiler system 102 can perform this operation by determining whether the program's execution exhibits looping behavior (e.g., by exhibiting repetition of instructions in the code).

In block 604, the TJIT compiler system 102 determines whether a detected loop warrants parallelization. The TJIT compiler system 102 can make this determination, in part, based on an assessment of whether or not the loop is hot. In one implementation, a sampling profiling approach can be used to detect a hot loop, which involves periodically interrupting the program to inspect which loop is currently executing. In another implementation, the code for the sequential normal execution mode can be augmented with an auxiliary counter for each loop that tracks precisely how often a loop is executed. In either case, if the execution count of a loop exceeds an implementation-specific threshold, the loop is considered to be hot. In addition, the TJIT compiler system 102 can consider other factors in making this determination.

Illustrative factors include: the number of processing resources 122 that are available; the current workload on the native system 110; a worst-case execution time of a previously recorded single trace; any type of dependencies on global resources (such as IO), etc. Some of this analysis in block 604 can be performed before performing detailed iterative investigation of the loop; other parts of this analysis may originate from the detailed investigation (e.g., in block 608).

In block 606, TJIT compiler system 102 executes code sequentially in different circumstances (e.g., in the normal sequential mode of execution). For example, the TJIT compiler system 102 can execute the code sequentially upon determining that a loop is not being performed, or upon determination that a loop is being performed that does not warrant parallelization. In other cases, the loop may be parallelizable; here, the TJIT compiler system 102 can perform operations in a sequential manner until that time as the analysis module 134 and native code generator module 112 can generate the recompiled parallelized code. At that time, the TJIT compiler system 102 can switch over from the sequential mode of loop execution to the parallel node of loop operation.

In block 608, providing that a loop exists and warrants parallelization, the analysis module 134 invokes a procedure for determining whether, in fact, it is possible (e.g., safe) to parallelize the loop.

Figure 7:
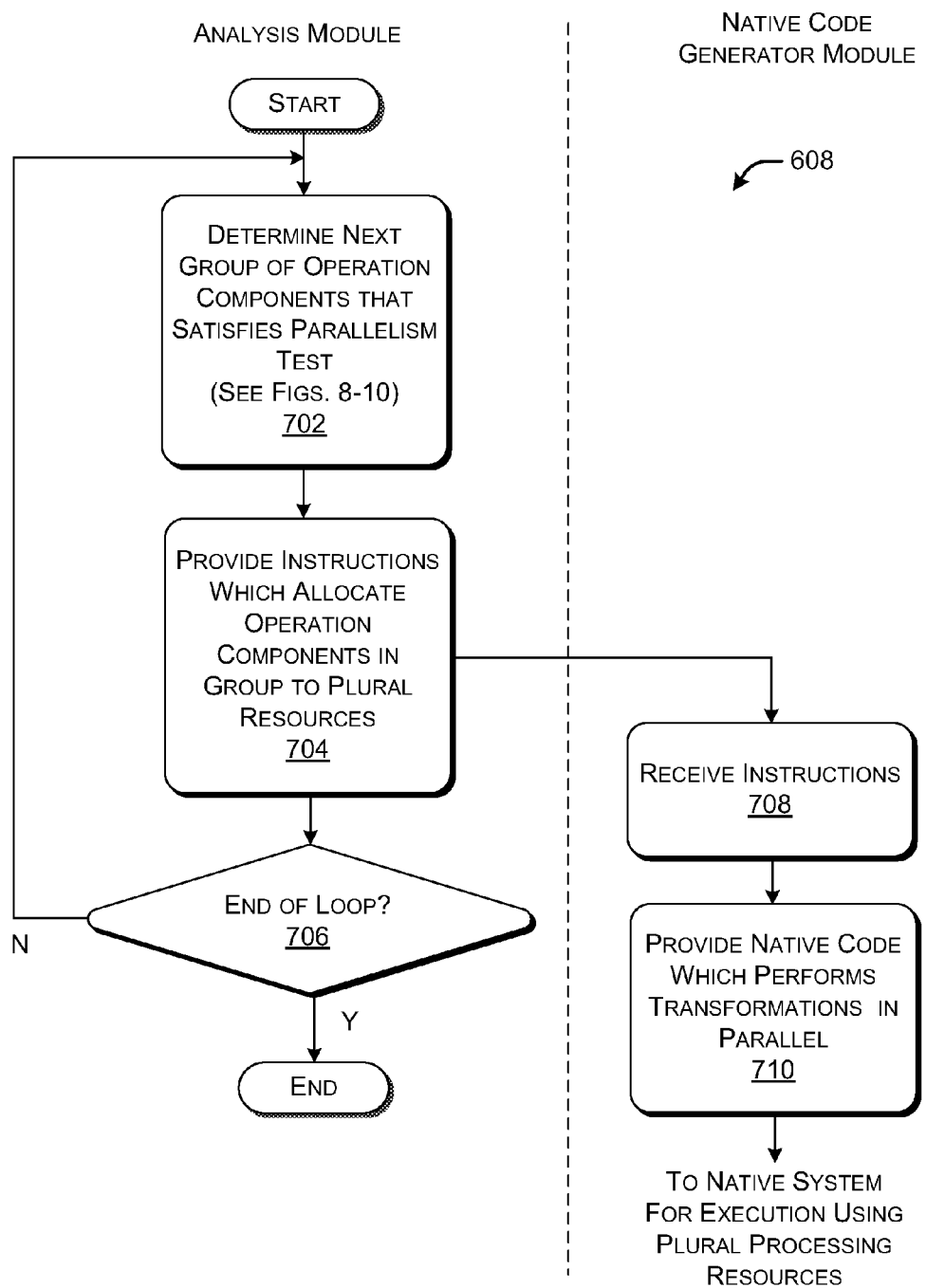
FIG. 7 is flowchart that shows a two-phase approach to establishing groups of operation components, where each group can then be processed using plural processing resources that operate in parallel.

FIG. 7 shows a procedure 700 for carrying out block 608 of FIG. 6. The procedure includes two phases performed in a successive manner over the loop, represented by blocks 702 and 704. In block 702, the analysis module 134 determines a group of operation components (associated with respective loop iterations) that satisfies the test of parallelism (described in Section A). The analysis module 134 performs this operation in piecemeal operation in the manner described above by extending the set of operation components until a conflict is discovered or some other terminating condition is reached. In block 704, the analysis module 134 provides instructions which prompt the recompilation of the code if no appropriate parallelized code exists yet. In block 706, the analysis module 134 repeats blocks 702 and 704 in the case that there are remaining operation components (e.g., loop iterations) to process.

In block 708, the native code generator module 112 receives the instruction from the analysis module 134, e.g., in the form of parallelized code 128. In block 710, the native code generator module 112 provides native code which carries out the desired parallel processing. If the same parallelized code 128 was translated by the native code generator module 112 to native code before, then the previously generated native code may be reused.

Figure 8:
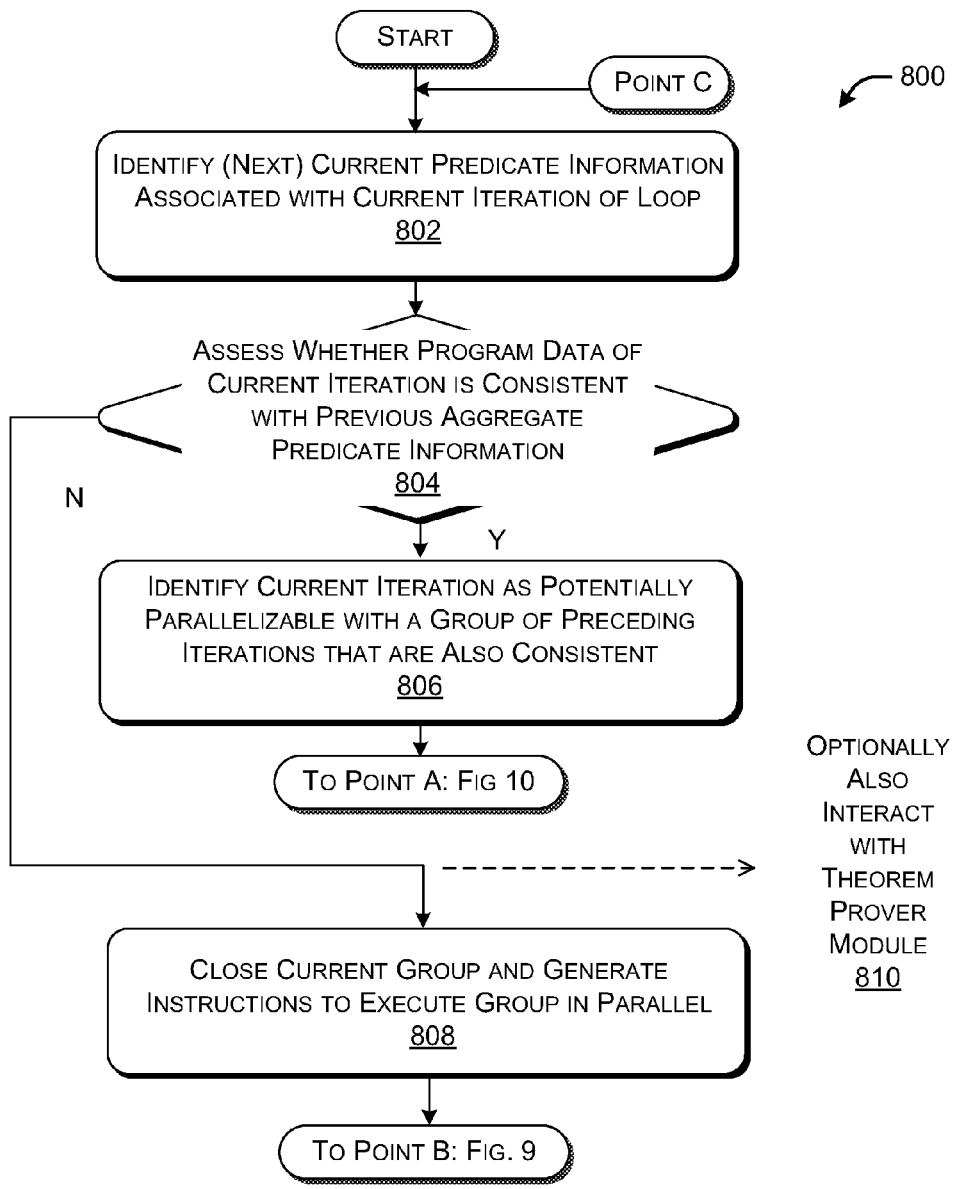
FIGS. 8-10 together comprise a flowchart that shows additional details regarding the formation of groups of operation components.
Figure 9:
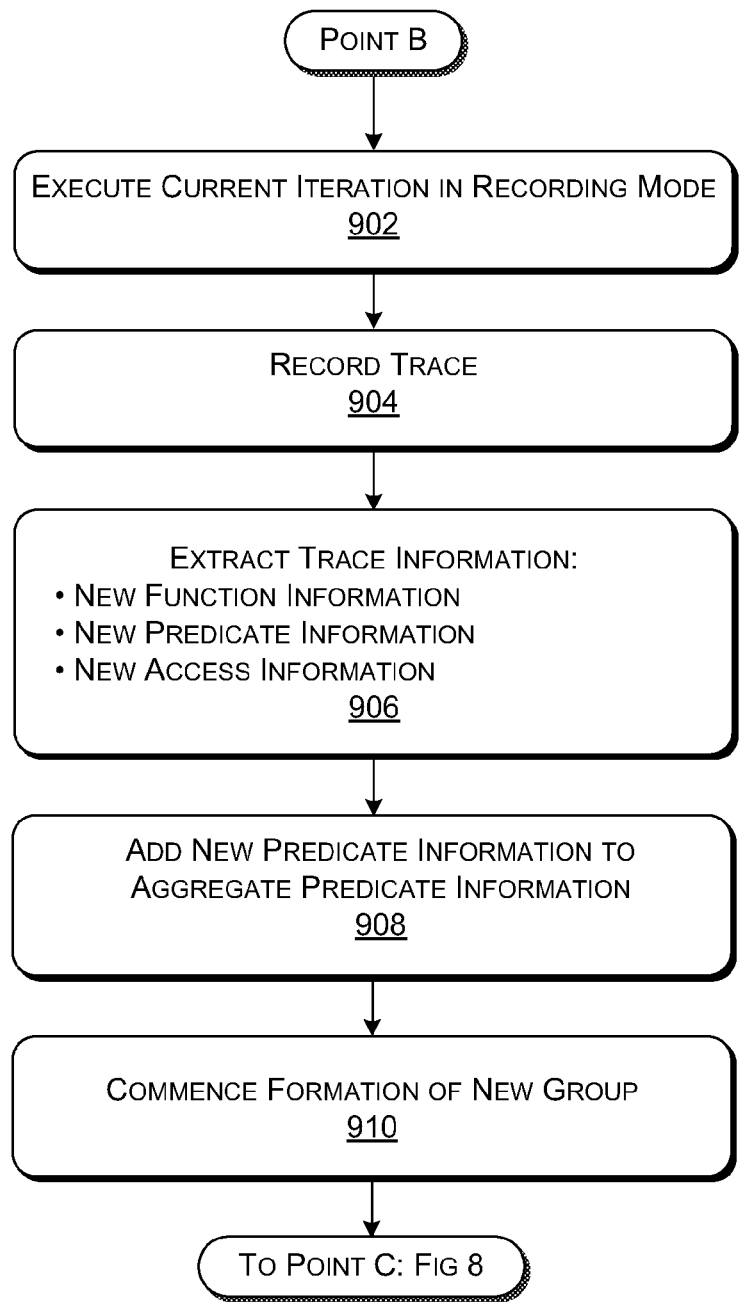
Figure 10:
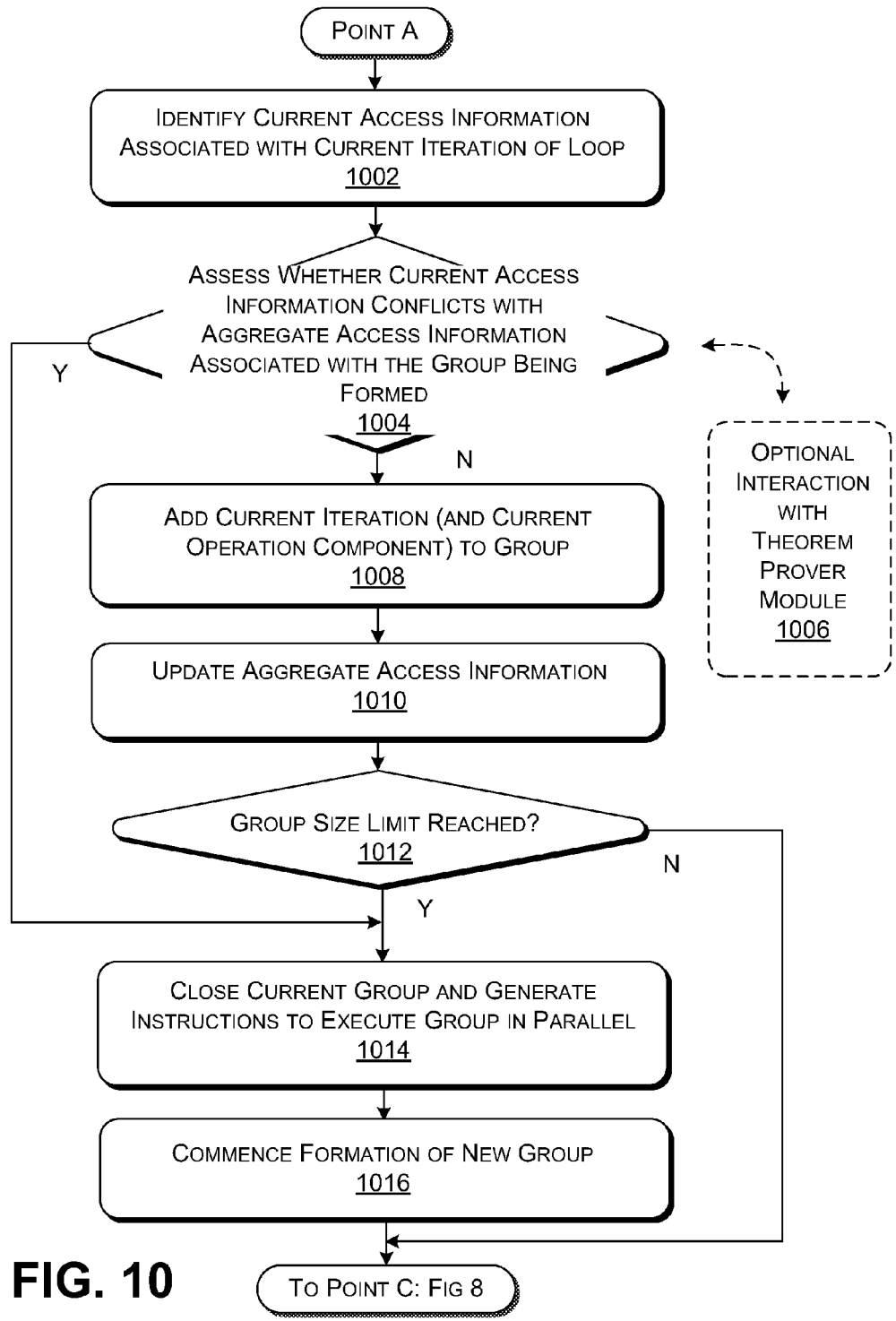

Finally, FIGS. 8-10 together shows additional details regarding one implementation of block 702 of FIG. 7. That is, in this procedure, the analysis module 134 determines groups of operation components, each of which can be processed in a parallel manner.

In block 802, the analysis module 134 identifies predicate information associated with the current iteration. It can extract this information based on program data received via the inspector mode of processing, e.g., by passing the inspector code 126 to the native system 110.

In block 804, the analysis module 134 determines whether the program data for the current iteration matches a previously encountered instance of predicate information (associated with a previously recorded traced). If so, this means that the current iteration will perform its operation in a normal known manner.

In block 806, presuming that there is a match, the analysis system 134 identifies the current iteration as potentially parallelizable with a group of preceding iterations that is being formed. This also means that the analysis system 134 can mine the matching trace for access information and function information, which are instantiated with respect to the current iteration.

In block 808, presuming that there is no match, the analysis module 134 "closes" the group of operation components being performed and advances to the trace-recording processing of FIG. 9. Action 810 indicates that, even if there is no match, the analysis module 134 can call on the theorem prover module 212 to simplify the predicate information, for example, by identifying redundant sub-predicates that are implied by other sub-predicates.

The procedure of FIG. 9 is called on whenever an iteration is found that has never-before encountered predicate information. In block 902 of FIG. 9, the analysis module 134 executes the current iteration in the trace-recording mode.

In block 904, the analysis module 134 records the trace that results from sending native code to the native system 110, where that native code is instrumented to perform a recording function.

In block 906, the analysis module 134 extracts trace information from the new trace, including function information, predicate information, and access information. As stated above, the analysis module 134 can record this trace information in generic parameterized form so that it can be compared with future iterations.

In block 908, the analysis module 134 adds the new predicate information to previously encountered predicate information to form aggregate predicate information. This aggregate predicate information constitutes the updated reference against which future instances of predicate information are compared.

In block 910, the analysis module 134 commences formation of a new group. Or more specifically stated, the analysis module 134 begins its investigation to determine whether the succeeding iterations (after the current iteration processed in FIG. 9) can be grouped together.

FIG. 10 shows the access-related processing that is performed when it is determined that the predicate-related checking passes. In block 1002, the analysis module 134 identifies the current access information associated with the current iteration. The current access information is the instantiation of the access information in the matching trace identified in FIG. 8. Although not stated in FIG. 10, the analysis module 134 also identifies function information from the matching trace. The function information describes a state transformation associated with the current iteration.

In block 1004, the analysis module 134 determines whether the current access information conflicts with the aggregate access information associated with the group being formed. For instance, the analysis module 134 can determine whether the current access information entails conflicting memory accesses, e.g., of a read/write type and/or a write/write type, with respect to the aggregate access information.

Action 1006 indicates that the analysis module 134 can consult the theorem prover module 212 to makes its determination of whether there is an access-related conflict. Further, if there is a conflict, the theorem prover module 212 may be used to identify sub-accesses that are included in other sub-accesses.

In block 1008, resuming that the access check passes, the analysis module 134 can add the current iteration (and associated operation component) to the group being formed.

In block 1010, the analysis module 134 updates the aggregate access information by adding the current access information to previous aggregate access information associated with the group.

In block 1012, the analysis module 134 determines whether a group size limit has been reached. This refers the size m of the "chunks" that are passed to the native system 110 for processing.

In block 1014, the analysis module 134 closes a current group being formed if either the access check fails or the group size limit is reached. In block 1016, the analysis module 134 commences formation of a new group, that is, insofar as there are additional iterations in the loop to process.

To repeat, the operations described above can be performed in various ways for different respective implementations. In one case, the analysis module 134 can perform these operations in the manner of an interpreter. In another case, one or more aspects of the operations can be delegated to the native system 110 which processes the inspector code 126 in the inspector mode. The flowcharts presented herein are intended to encompass at least these two implementations.

This section closes with an example. Assume that a loop has 1000 iterations. Predicate information X(i) applies to iterations 1-450. Iteration 451 introduces new predicate information Y(i). From iterations 452-1000, the iterations variously invoke both predicates X(i) and Y(i). Assume that the analysis module 134 is also configured to break iterations into groups that have no more than 100 iterations.

The analysis module 134 first invokes the trace-recording mode to record a trace for iteration 1, upon which it records trace information for trace 1. This trace information include predicate information, namely X(i), access information, and function information. The analysis module 134 then begins forming its first group, starting with iteration 2. At this point, the analysis module 134 investigates the loop in inspector mode, e.g., by sending inspector code 126 to the native system 110.

The analysis module 134 first concludes that iteration 2 has program data that is consistent with previously encountered predicate information. The analysis module 134 then advances to the access-related checking. Since there is no other iteration in the group, this check passes, by default. The analysis module 134 performs this same processing until: a) it encounters program data that is inconsistent with previously encountered predicate information; or b) it encounters access information which conflicts with previously identified aggregate access information; or c) the group reaches its maximum size of 100. In the above-described scenario, if there are no access-related conflicts, the analysis system 134 can form a group up to iteration 101. The analysis module 134 then forms parallelized code 128 for this group (if it has not already been formed). The native code generator module 114 converts this parallelized code 128 into native code, which it passes to the native system 110. The native system 110 then operates on the 100 iterations using its plural processing resources 122. The analysis module 134 then starts another group, beginning with iteration 102. In performing its analysis for iterations 1-450, the analysis module 134 draws from the same trace that was recorded for iteration 1. That is, for example, when determining the current access information for iteration 235, the analysis module 134 instantiates the parameterized access information (for trace 1) for iteration 235.

Assume now that the analysis module 134 reaches iteration 451, where it encounters program data associated with the new predicate information Y(i). The analysis module 134 will conclude that the new predicate information does not match the predicate information for any prior trace. In response, the analysis module 134 will close the group being formed at that time and send it to the native system 110 in the manner described above. Once the execution of closed group has finished, the analysis module 134 will then switch to the trace-recording mode to record a trace for iteration 451. This enables the analysis module to update the aggregate predicate information to include both predicate information X(i) and Y(i).

The analysis module 134 then switches back to the inspector mode, whereupon it begins forming a new group, starting with iteration 452. This presumes that the analysis module 134 formally executes iteration 451 in the trace-recording mode.

Henceforth, the analysis module 134 will encounter iterations that pertain to either predicate information X(i) or Y(i). Since the analysis module 134 has seen both of this instances, the predicate check will pass.

C. Representative Processing Functionality

FIG. 11 sets forth illustrative electrical data processing functionality 1100 that can be used to implement any aspect of the functions described above. With reference to FIG. 1, for instance, the type of processing functionality 1100 shown in FIG. 11 can be used to implement any aspect of the TJIT compiler system 102 and/or the native system 110. In one case, the processing functionality 1100 may correspond to any type of computing device that includes one or more processing devices.

The processing functionality 1100 can include volatile and non-volatile memory, such as RAM 1102 and ROM 1104, as well as one or more processing devices 1106. The processing functionality 1100 also optionally includes various media devices 1108, such as a hard disk module, an optical disk module, and so forth. The processing functionality 1100 can perform various operations identified above when the processing device(s) 1106 executes instructions that are maintained by memory (e.g., RAM 1102, ROM 1104, or elsewhere). More generally, instructions and other information can be stored on any computer readable medium 1110, including, but not limited to, static memory storage devices, magnetic storage devices, optical storage devices, and so on. The term computer readable medium also encompasses plural storage devices.

The processing functionality 1100 also includes an input/output module 1112 for receiving various inputs from a user (via input modules 1114), and for providing various outputs to the user (via output modules). One particular output mechanism may include a presentation module 1116 and an associated graphical user interface (GUI) 1118. The processing functionality 1100 can also include one or more network interfaces 1120 for exchanging data with other devices via one or more communication conduits 1122. One or more communication buses 1124 communicatively couple the above-described components together.

In closing, the description may have described various concepts in the context of illustrative challenges or problems. This manner of explication does not constitute an admission that others have appreciated and/or articulated the challenges or problems in the manner specified herein.

Further, the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by one or more processing devices, the method comprising:
    collecting traces that result from execution of a loop within code, the execution of the code involving execution of plural operation components associated with respective iterations of the loop;
    forming:
        aggregate predicate information describing conditions associated with the execution of the respective iterations of the loop, and
        aggregate access information describing memory accesses performed by the respective iterations of the loop;
    determining whether to add an individual operation component to a parallelizable group of operation components based on the aggregate predicate information and the aggregate access information, wherein the individual operation component is associated with an individual iteration of the loop; and
    in an instance when the individual operation component is added to the parallelizable group, providing instructions which allocate the parallelizable group of operation components to plural processing resources of a native system.

2. The method of claim 1, further comprising:
    generating native code that operates the plural processing resources at least partly in parallel using the instructions,
    wherein, in the instance when the individual operation component is added to the parallelizable group, the individual operation component is processed by the plural processing resources in parallel with at least one other operation component of the parallelizable group.

3. The method of claim 2, wherein the collecting, the forming, the determining, and the providing are performed during runtime of the code.

4. The method of claim 2, wherein the collecting, the forming, the determining, and the providing are performed during a single execution of the code.

5. The method of claim 4, wherein the collecting, the forming, the determining, and the providing are performed as the loop is being executed by the plural processing resources.

6. The method of claim 1, wherein the code comprises intermediate code that carries out the loop as a linear sequence of instructions.

7. The method of claim 6, further comprising:
    modifying the intermediate code according to the parallelizable group to obtain parallelized intermediate code.

8. The method of claim 7, further comprising:
    compiling the parallelized intermediate code into native code that executes the loop on the plural processing resources at least partly in parallel.

9. The method of claim 1, further comprising:
    deciding to perform the collecting, the forming, the determining, and the providing for the loop based on one or more factors relating to execution of the loop; and
    deciding not to perform the collecting, the forming, the determining, and the providing for at least one other loop within the code based on the one or more factors.

10. A tracing just-in-time (TJIT) compiler system, comprising:
    one or more memories storing:
        a trace collecting module configured to collect traces that result from sequential execution of a loop within code, the sequential execution involving execution of plural operation components associated with respective iterations of the loop;
        a trace information providing module configured to provide trace information based on the traces in a recording mode, the trace information being used to form:
            aggregate predicate information describing conditions associated with execution of the respective iterations of the loop, and
            aggregate access information describing memory accesses performed by the respective iterations of the loop;
        a parallelization analysis module configured to make a determination of whether a current operation component, associated with a current iteration, can be added to a parallelizable group of operation components, the determination being based on the aggregate predicate information and the aggregate access information associated with the parallelizable group;
        an instruction module configured to provide instructions which allocate operation components in the parallelizable group to plural processing resources of a native system, the instructions being provided based on analysis performed by the parallelization analysis module;
        a native code generator module configured to use the instructions to generate native code to operate the plural processing resources; and
    one or more processing devices configured to execute the trace collecting module, the trace information providing module, the parallelization analysis module, the instruction module, and the native code generator module stored on the one or more memories.

11. The TJIT compiler system of claim 10, wherein the trace collecting module is configured to collect another trace when another current iteration is encountered having current program data that is not consistent with any instance of aggregate predicate information associated with previously collected traces.

12. The TJIT compiler system of claim 10, wherein the parallelization analysis module is configured to determine whether the current operation component can be added to the parallelizable group of operation components by determining whether current program data associated with the current iteration is consistent with at least one instance of aggregate predicate information associated with the parallelizable group of operation components.

13. The TJIT compiler system of claim 10, wherein the parallelization analysis module is configured to determine whether the current operation component can be added to the parallelizable group of operation components by determining whether current access information associated with the current iteration conflicts with the aggregate access information associated with the parallelizable group of operation components.

14. The TJIT compiler system of claim 10, wherein the parallelization analysis module is configured to determine whether the current operation component can be added to the parallelizable group of operation components by consulting a theorem prover module.

15. The TJIT compiler system of claim 10, wherein the instructions are based on function information extracted from at least one of the traces, the function information describing a transformation from one state to another.

16. A volatile or non-volatile memory device or non-volatile storage device having stored thereon computer readable instructions, the computer readable instructions providing an analysis module when executed by one or more processing devices, the computer readable instructions comprising:

trace information providing logic operative to provide trace information based on traces, the trace information including, for iterations involved in execution of a loop within code:
- current predicate information that describes a condition associated with execution of the loop for a current iteration of the loop, wherein the current iteration of the loop precedes completion of the loop, and
- current access information that describes memory that is accessed by the current iteration; and parallelization analysis logic operative to determine, prior to completion of the loop, a group of operation components of the loop that can be executed in parallel prior to the completion of the loop, wherein the group of operation components are determined based on the trace information supplied by the trace information providing logic, wherein the parallelization analysis logic is operative to determine whether a current operation component can be added to the group of operation components by determining whether current access information associated with the current operation component conflicts with aggregate access information associated with the group of operation components.

17. The volatile or non-volatile memory device or non-volatile storage device of claim 16, wherein the analysis module is operative to invoke the trace information providing logic and the parallelization analysis logic upon detecting looping behavior in execution of the code that is determined to warrant parallelization.

18. The volatile or non-volatile memory device or non-volatile storage device of claim 16, wherein the parallelization analysis logic is operative to iteratively form aggregate predicate information by combining instances of current predicate information that differ from previously encountered instances of predicate information.

19. The volatile or non-volatile memory device or non-volatile storage device of claim 16, wherein the parallelization analysis logic is operative to iteratively form the aggregate access information by combining instances of corresponding access information associated with the operation components within the group.

20. The volatile or non-volatile memory device or non-volatile storage device of claim 16, wherein the group of operation components comprise intermediate language code.

* * * * *